United States Patent
Kasama

(10) Patent No.: US 9,425,718 B2
(45) Date of Patent: Aug. 23, 2016

(54) VIBRATION DEVICE AND INFORMATION PROCESSING APPARATUS

(71) Applicant: FUJITSU LIMITED, Kawasaki-shi, Kanagawa (JP)

(72) Inventor: Kouichirou Kasama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 14/020,379

(22) Filed: Sep. 6, 2013

(65) Prior Publication Data

US 2014/0159619 A1 Jun. 12, 2014

(30) Foreign Application Priority Data

Dec. 12, 2012 (JP) ................. 2012-271211

(51) Int. Cl.
*H02P 5/46* (2006.01)
*B06B 1/02* (2006.01)
*B06B 1/16* (2006.01)

(52) U.S. Cl.
CPC ................. *H02P 5/46* (2013.01); *B06B 1/023* (2013.01); *B06B 1/161* (2013.01)

(58) Field of Classification Search
CPC ............ A61H 23/0254; A61H 15/0078; A61H 2201/1678; A61H 2201/5097; G05B 19/06
See application file for complete search history.

(56) References Cited

U.S. PATENT DOCUMENTS

| 5,271,290 | A | * | 12/1993 | Fischer | .................... | 74/471 XY |
| 7,078,846 | B2 | * | 7/2006 | Tsukui | ..................... | G01P 1/08 310/317 |
| 7,979,797 | B2 | * | 7/2011 | Schena | ......................... | 715/701 |
| 8,384,316 | B2 | * | 2/2013 | Houston | ................. | A63F 13/06 318/114 |
| 2005/0131319 | A1 | * | 6/2005 | der Meer | ........................ | 601/49 |
| 2006/0290662 | A1 | | 12/2006 | Houston et al. | | |
| 2007/0273309 | A1 | * | 11/2007 | Carmen | ......................... | 318/16 |

FOREIGN PATENT DOCUMENTS

| JP | 2004-040321 A | 2/2004 |
| JP | 2004-177360 A | 6/2004 |
| JP | 2005-221277 A | 8/2005 |
| JP | 2006-003269 A | 1/2006 |
| JP | 2008-209137 A | 9/2008 |
| JP | 2008-546534 | 12/2008 |

OTHER PUBLICATIONS

Office Action of Japan Patent Application 2012-271211 dated May 10, 2016. Translation of the relevant part, p. 1, line 29 to p. 2, line 31 of the Office Action.

* cited by examiner

*Primary Examiner* — Eduardo Colon Santana
*Assistant Examiner* — Bickey Dhakal
(74) *Attorney, Agent, or Firm* — Maschoff Brennan

(57) ABSTRACT

A disclosed vibration device includes a first vibrating motor that causes a first eccentric spindle to be rotated so that an angular velocity changes regularly within a rotation period, and a second vibrating motor that causes a second eccentric spindle to be rotated in the same angular velocity as the angular velocity of the first eccentric spindle in an opposite rotation direction to a rotation direction of the first eccentric spindle. Then, the first vibrating motor and the second vibrating motor are arranged so that a rotating shaft of the first vibrating motor is parallel with a rotating shaft of the second vibrating motor.

3 Claims, 8 Drawing Sheets

VIBRATION DEVICE AND INFORMATION PROCESSING APPARATUS

CROSS-REFERENCE TO RELATED APPLICATIONS

This application is based upon and claims the benefit of priority of the prior Japanese Patent Application No. 2012-271211, filed on Dec. 12, 2012, the entire contents of which are incorporated herein by reference.

FIELD

This invention relates to a control technique of a vibration motor.

BACKGROUND

Vibration devices are used for many various purposes. For example, in a portable telephone terminal, a vibration device is used as means for notifying an incoming call or e-mail, or for notifying a specific time, and the like. In conditions where it is not suitable to emit a sound, a vibration device is in a silent mode of the portable telephone terminal to cause the user to recognize notification such as described above by way of cenesthesia instead of hearing.

Currently, vibration devices that are used for portable telephone terminals create a very small vibration. Therefore, as long as the pocket in which the portable telephone terminal is placed is near the body of the user, it is easy for the user to feel the vibration, however, when the portable telephone terminal is placed in the pocket of a coat or thick clothing, the vibration is absorbed by the cloth and becomes difficult for the user to feel.

Moreover, depending on the site on the body where the vibration is transmitted, the vibration may be difficult to feel. Furthermore, there are differences among individuals of how well the vibration is felt, and for a user that cannot easily feel the vibration, notification by a current vibration device may not be useful.

SUMMARY

A vibration apparatus relating to one aspect of this invention includes: (A) a first vibrating motor that causes a first eccentric spindle to be rotated so that an angular velocity changes regularly within a rotation period; and (B) a second vibrating motor that causes a second eccentric spindle to be rotated in the same angular velocity as the angular velocity of the first eccentric spindle in an opposite rotation direction to a rotation direction of the first eccentric spindle. Then, the first vibrating motor and the second vibrating motor are arranged so that a rotating shaft of the first vibrating motor is parallel with a rotating shaft of the second vibrating motor.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

[Embodiment 1]

In this embodiment, two vibrating motors are used. First, the two vibrating motors will be explained.

Figure 1:
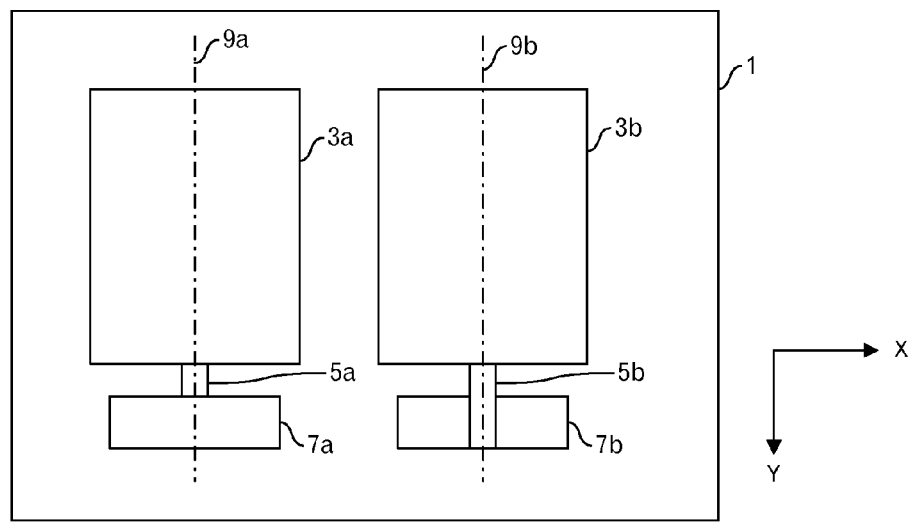
FIG. 1 is a top-view diagram depicting an arrangement example of vibrating motors.

FIG. 1 is a top view illustrating an example of the arrangement of the vibrating motors. A vibrating motor 3a and vibrating motor 3b are installed on a substrate 1. The vibrating motor 3a and vibrating motor 3b are, for example, DC motors. However, the motors could also be AC motors. The vibrating motor 3a and vibrating motor 3b similarly generate torque according to the voltage being applied.

A rotating shaft 5a is a shaft that transmits the rotation generated by the vibrating motor 3a. A rotating shaft 5b is a shaft that transmits the rotation generated by the vibrating motor 3b. An eccentric spindle 7a is an example of an eccentric body that is attached to the rotating shaft 5a. An eccentric spindle 7b is an example of an eccentric body that is attached to the rotating shaft 5b. The eccentric spindle 7a and eccentric spindle 7b may also be called weights. Generally, a material having a large specific gravity such as tungsten is used. A rotating shaft 9a is a shaft for the rotation generated by the vibrating motor 3a. A rotating shaft 9b is a shaft for the rotation generated by the vibrating motor 3b.

The vibrating motor 3a and vibrating motor 3b are fastened to the substrate 1 so that the rotating shaft 9a and rotating shaft 9b are parallel and are in the same direction. The method for fastening the motors may be a method of adhesion using an adhesive, fastening using a fixture, and the like.

In the following, the positive direction of the X-axis will be explained as being to the right in the drawings, the positive direction of the Y-axis will be explained as being toward the front in the drawings, and the Z-axis will be explained as being up in the drawings.

Figure 2:
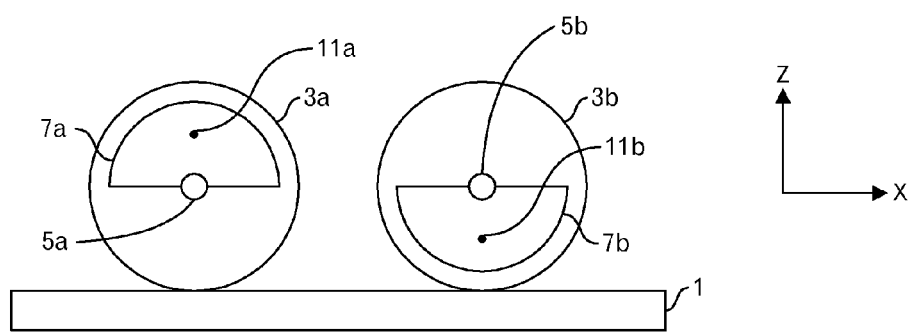
FIG. 2 is a front-view diagram depicting an arrangement example of vibrating motors.

FIG. 2 is a front view illustrating an arrangement example of the vibrating motors. As described above, the vibrating motor 3a and vibrating motor 3b are set on the substrate 1. The rotating shaft 5a, rotating shaft 5b, eccentric spindle 7a and eccentric spindle 7b are as illustrated in FIG. 1. The center of gravity 11a is illustrated as the position of the center of gravity of the cross section of the eccentric spindle 7a. The center of gravity 11b is illustrated as the position of the center of gravity of the cross section of the eccentric spindle 7b. The eccentric spindle 7a and the eccentric spindle 7b are presumed to be identical having the same density, shape and size.

Figure 3:
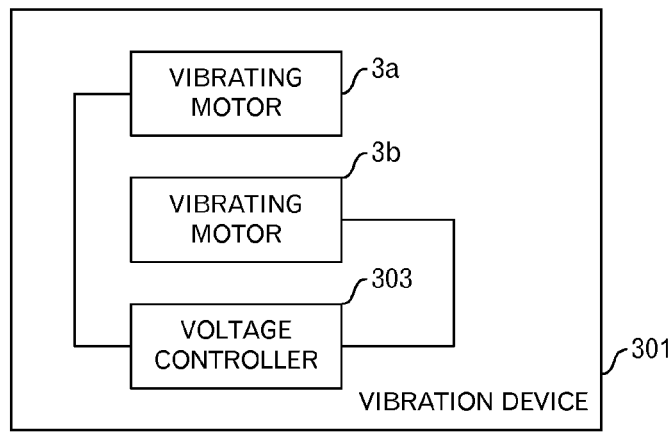
FIG. 3 is a diagram depicting a modular configuration example of a vibration device.

FIG. 3 illustrates a modular configuration example of a vibration device. The vibration device 301 has a voltage controller 303 that applies a voltage to the vibrating motor 3a and vibrating motor 3b as described above. The voltage controller 303 regulates the voltage that is applied to the vibrating motor 3a and vibrating motor 3b. The voltage controller 303 may impress the regulated voltage to the vibrating motor 3a and vibrating motor 3b. Alternatively, the voltage controller 303 may control the power supply so that the regulated voltage is applied from the power supply to the vibrating motor 3a and vibrating motor 3b.

Figure 4:
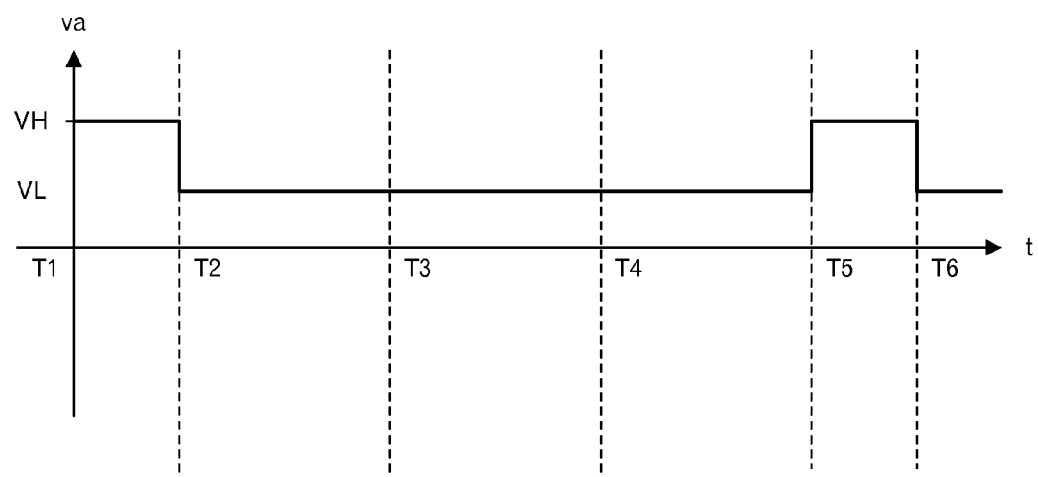
FIG. 4 is a diagram depicting an example of an impressed voltage in the first vibrating motor.

Next, the voltage that is applied to the vibrating motor 3a and vibrating motor 3b will be explained. FIG. 4 illustrates an example of the voltage applied to the vibrating motor 3a. In this figure, the horizontal axis represents time, and the vertical axis represents the voltage va that is applied to the vibrating motor 3a. The period of one cycle of the applied voltage is from time T1 to time T5, and matches the period of one rotation of the vibrating motor 3a. A high positive voltage VH is applied from time T1 to time T2. A low positive voltage VL is applied from time T2 to time T5. After time T5, the same cycle as from time T1 to time T5 is repeated.

Figure 5:
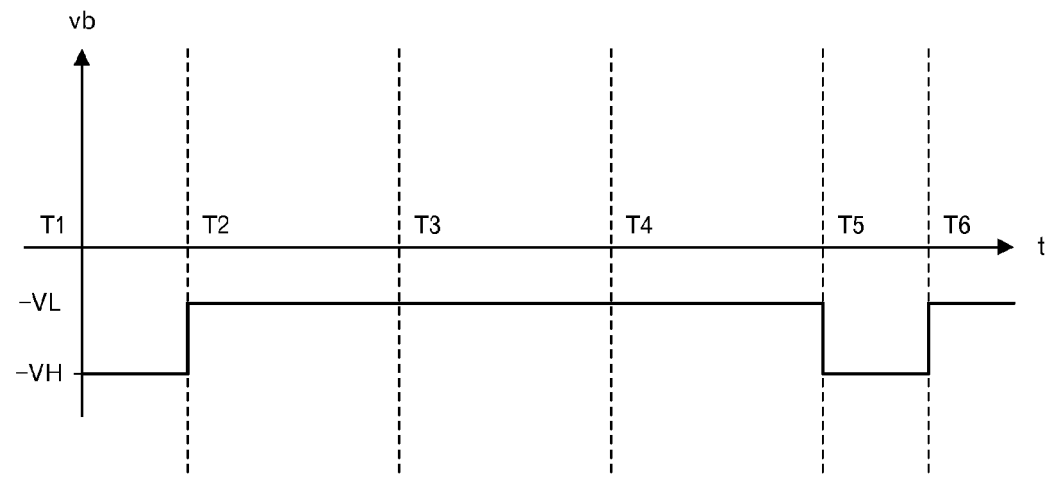
FIG. 5 is a diagram depicting an example of an impressed voltage in the second vibrating motor.

FIG. 5 illustrates an example of the voltage applied to the vibrating motor 3b. In this figure, the horizontal axis represents time, and the vertical axis represents the voltage vb that is applied to the vibrating motor 3b. The period of one cycle of the applied voltage is from time T1 to time T5, and is the same as illustrated in FIG. 4. A high negative voltage −VH is applied from time T1 to time T2. A low negative voltage −VL is applied from time T2 to time T5. After time T5, the same cycle as from time T1 to time T5 is repeated. In this way, the voltage having the same quantity as the voltage applied to the vibrating motor 3a and having reverse polarity is applied to the vibrating motor 3b. Controlling the applied voltage as described above is performed by the voltage controller 303 as described above.

Figure 6:
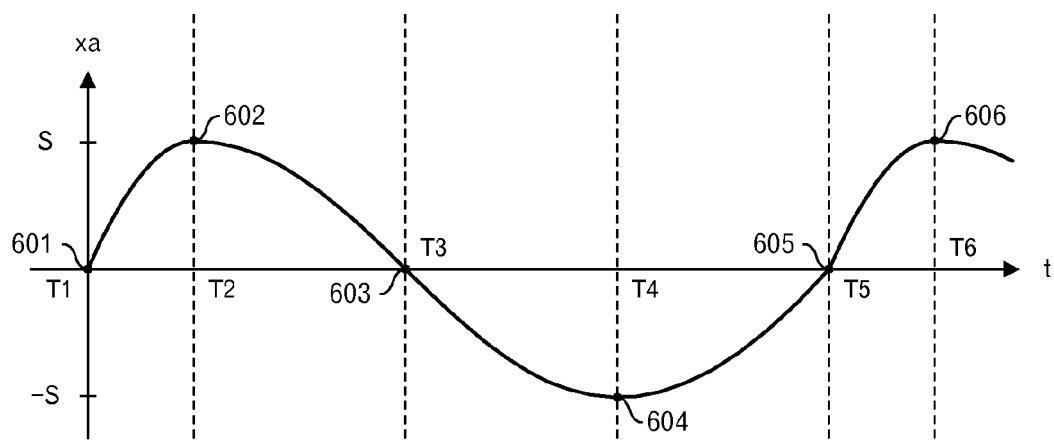
FIG. 6 is a diagram depicting displacements of the center of gravity of a first eccentric spindle in the X-direction.
Figure 10:
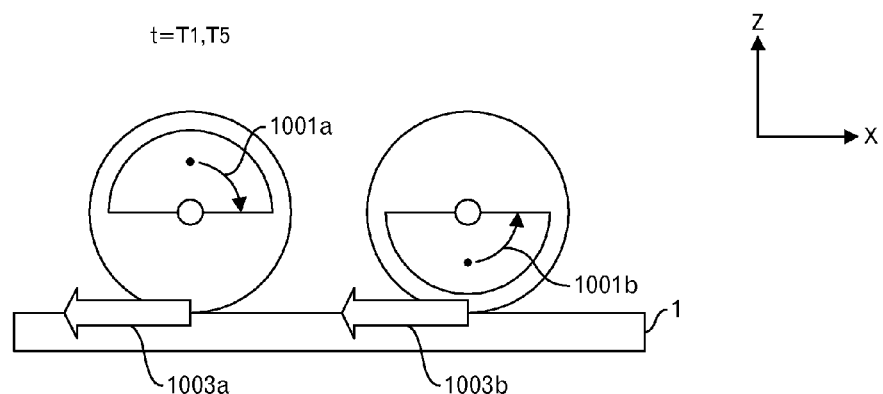
FIG. 10 is a diagram depicting states at time T1 and time T5.
Figure 11:
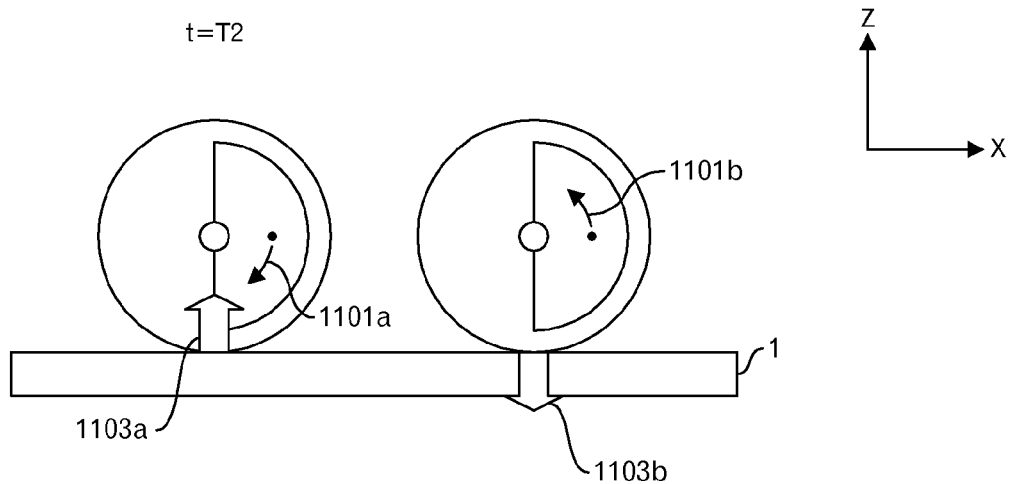
FIG. 11 is a diagram depicting a state at time T2.
Figure 12:
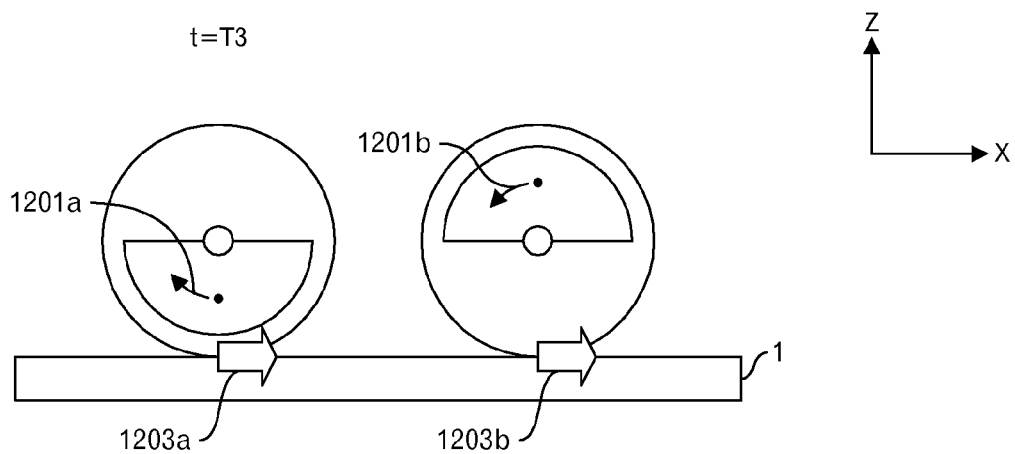
FIG. 12 is a diagram depicting a state at time T3.
Figure 13:
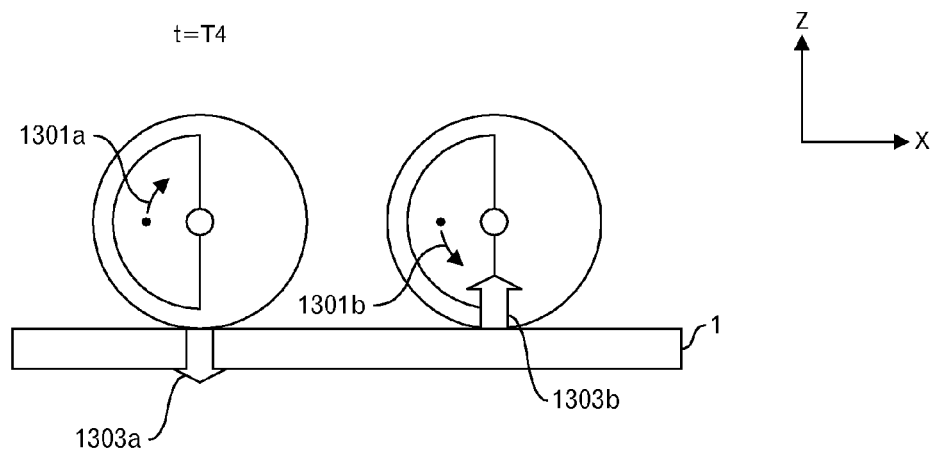
FIG. 13 is a diagram depicting a state at time T4.

Next, the displacement of the center of gravity 11a of the eccentric spindle 7a and the displacement of the center of gravity 11b of the eccentric spindle 7b will be explained. FIG. 6 illustrates the displacement of the center of gravity 11a of the first eccentric spindle 7a in the X direction. In this figure, the horizontal axis represents the time, and the vertical axis represents the displacement xa of the center of gravity 11a of the eccentric spindle 7a in the X direction. The period of one cycle of the impressed voltage is from time T1 to T5 as in FIG. 4 and FIG. 5. In the figure, S represents the distance between the rotating shaft 9a and the center of gravity 11a. At time T1, the state is as illustrated in FIG. 10 described later, and point 601 represents the displacement xa(T1)=0 of the center of gravity 11a of the eccentric spindle 7a in the X direction at time t=T1. At time T2, the state is as illustrated in FIG. 11 described later, and point 602 represents the displacement xa(T2) =S of the center of gravity 11a of the eccentric spindle 7a in the X direction at time t=T2. At time T3, the state is as illustrated in FIG. 12 described later, and point 603 represents the displacement xa(T3)=0 of the center of gravity 11a of the eccentric spindle 7a in the X direction at time t=T3. At time T4, the state is as illustrated in FIG. 13 described later, and point 604 represents the displacement xa(T4)=−S of the center of gravity 11a of the eccentric spindle 7a at time t=T4 in the X direction. At time T5, the state returns to the state illustrated in FIG. 10 described later, and point 605 represents the displacement xa(T5)=0 of the center of gravity 11a of the eccentric spindle 7a in the X direction at time t=T5. After time T5, the same cycle as from time T1 to time T5 is repeated. For example, point 606 is the same as point 602.

Figure 7:
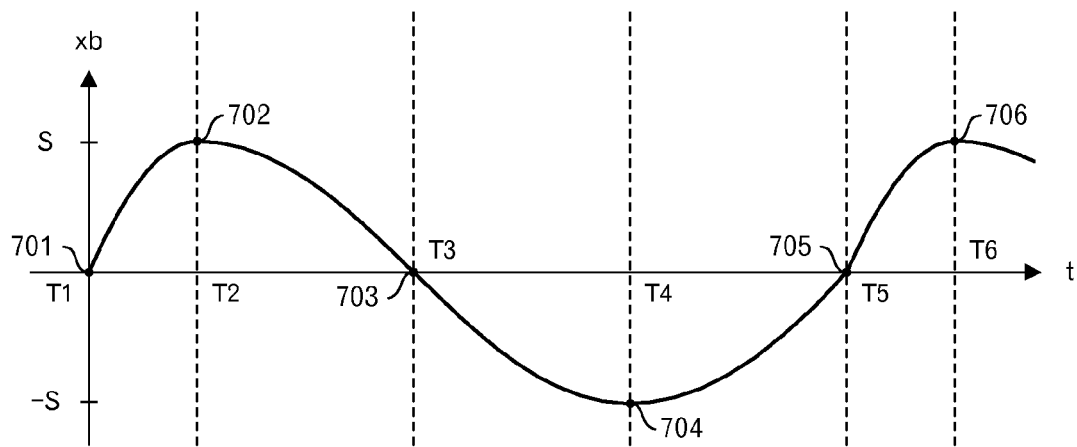
FIG. 7 is a diagram depicting displacements of the center of gravity of a second eccentric spindle in the X-direction.

FIG. 7 illustrates the displacement of the center of gravity 11b of the second eccentric spindle 7b in the X direction. In this figure, the horizontal axis represents the time, and the vertical axis represents the displacement xb of the center of gravity 11b of the eccentric spindle 7b in the X direction. The period of one cycle of the impressed voltage is from time T1 to T5 as in FIG. 4 to FIG. 6. In the figure, S represents the distance between the rotating shaft 9b and the center of gravity 11b. At time T1, the state is as illustrated in FIG. 10 described later, and point 701 represents the displacement xb(T1) =0 of the center of gravity 11b of the eccentric spindle 7b in the X direction at time t=T1. At time T2, the state is as illustrated in FIG. 11 described later, and point 702 represents the displacement xb(T2)=S of the center of gravity 11b of the eccentric spindle 7b in the X direction at time t=T2. At time T3, the state is as illustrated in FIG. 12 described later, and point 703 represents the displacement xb(T3)=0 of the center of gravity 11b of the eccentric spindle 7b in the X direction at time t=T3. At time T4, the state is as illustrated in FIG. 13 described later, and point 704 represents the displacement xb(T4) =−S of the center of gravity 11b of the eccentric spindle 7b in the X direction at time t=T4. At time T5, the state returns to the state illustrated in FIG. 10 described later, and point 705 represents the displacement xb(T5)=0 of the center of gravity 11b of the eccentric spindle 7b in the X direction at time t=T5. After time T5, the same cycle as from time T1 to time T5 is repeated. For example, point 706 is the same point 702.

In this way, the displacement xa of the center of gravity 11a of the first eccentric spindle 7a in the X direction matches the displacement xb of the center of gravity 11b of the second eccentric spindle 7b in the X direction.

Figure 8:
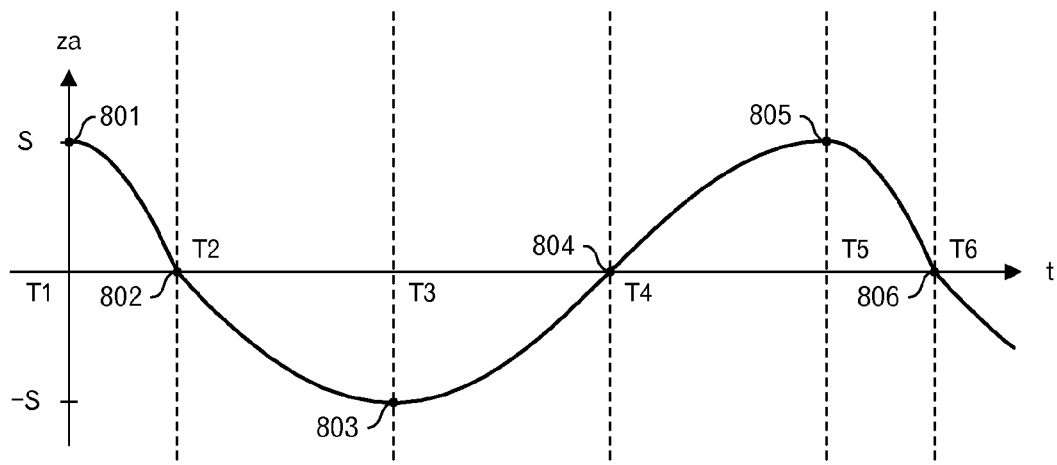
FIG. 8 is a diagram depicting displacements of the center of gravity of the first eccentric spindle in the Z-direction.

FIG. 8 illustrates the displacement of the first eccentric spindle 7a in the Z direction. In this figure, the horizontal axis represents time, and the vertical axis represents the displacement za of the center of gravity 11a of the eccentric spindle 7a in the Z direction. The period of one cycle is from time T1 to T5 as in FIG. 4 to FIG. 7. At time T1, the state is as illustrated in FIG. 10 described later, and point 801 represents the displacement za(T1)=S of the center of gravity 11a of the eccentric spindle 7a in the Z direction at time t=T1. At time T2, the state is as illustrated in FIG. 11 described later, and point 802 represents the displacement za(T2) =0 of the center of gravity 11a of the eccentric spindle 7a in the Z direction at time t=T2. At time T3, the state is as illustrated in FIG. 12 described later, and point 803 represents the displacement za(T3)=−S of the center of gravity 11a of the eccentric spindle 7a in the Z direction at time t=T3. At time T4, the state is as illustrated in FIG. 13 described later, and point 804 represents the displacement za(T4)=0 of the center of gravity 11a of the eccentric spindle 7a in the Z direction at time t=T4. At time T5, the state returns to the state illustrated in FIG. 10 described later, and point 805 represents the displacement za(T5)=S of the center of gravity 11a of the eccentric spindle 7a in the Z direction at time t=T5. After time T5, the same cycle as from time T1 to time T5 is repeated. For example, point 806 is the same as point 802.

Figure 9:
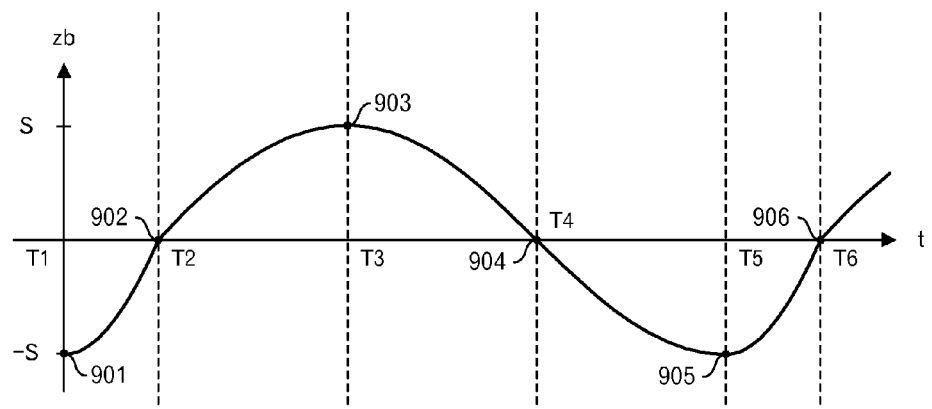
FIG. 9 is a diagram depicting displacements of the center of gravity of the second eccentric spindle in the Z-direction.

FIG. 9 illustrates the displacement of the second eccentric spindle 7b in the Z direction. In this figure, the horizontal axis represents time, and the vertical axis represents the displacement zb of the center of gravity 11b of the eccentric spindle 7b in the Z direction. The period of one cycle is from time T1 to time T5 as in FIG. 4 to FIG. 8. At time T1, the state is as illustrated in FIG. 10 described later, and point 901 represents the displacement zb(T1)=−S of the center of gravity 11b of the eccentric spindle 7b in the Z direction at time t=T1. At time T2, the state is as illustrated in FIG. 11 described later, and point 902 represents the displacement zb(T2) =0 of the center of gravity 11b of the eccentric spindle 7b in the Z direction at time t=T2. At time T3, the state is as illustrated in FIG. 12 described later, and point 903 represents the displacement zb(T3)=S of the center of gravity 11b of the eccentric spindle 7b at time t=T3. At time T4, the state is as illustrated in FIG. 13 described later, and point 904 represents the displacement zb(T4)=0 of the center of gravity 11b of the eccentric spindle 7b in the Z direction at time t=T4. At time T5, the state returns to the state illustrated in FIG. 10 described later, and point 905 represents the displacement zb(T5)=−S of the center of gravity 11b of the eccentric spindle 7b in the Z direction at time t=T5. After time T5, the same cycle as from time T1 to time T5 is repeated. For example, point 906 is the same as point 902.

As illustrated in FIG. 4 and FIG. 5, between time T1 and time T2, high voltage (VH, −VH) is impressed, so the vibrating motor 3a and vibrating motor 3b are accelerated, and the angular velocity of each motor increases. Moreover, as illustrated in FIG. 4 and FIG. 5, between time T2 and time T5, a low voltage (VL, −VL) is impressed, so the vibrating motor 3a and vibrating motor 3b is decelerated, and the angular velocity of each motor decreases. However, the displacements illustrated in FIG. 6 to FIG. 9 are schematic illustrations, and the actual change is expected to be smooth. This is because the change depends on the reaction performance from when high voltage is impressed to the vibrating motor 3a and vibrating motor 3b until the motors are actually accelerated.

Next, the transition among states from time T1 to time T5 will be explained.

FIG. 10 illustrates the states at time T1 and at time T5. The positions of the eccentric spindle 7a and the eccentric spindle 7b are as illustrated by the displacements illustrated in FIG. 6 to FIG. 9. As illustrated in FIG. 4, at time T1 and time T5, the voltage that is impressed to the vibrating motor 3a becomes VH, so a positive large angular acceleration is generated. Therefore, the angular velocity 1001a is large. Moreover, the reaction force 1003a received from the vibrating motor 3a also becomes large. Similarly, as illustrated in FIG. 5, at time T1 and time T5, the voltage that is impressed to the vibrating motor 3b becomes −VH, so a negative large angular acceleration is generated during rotation in the opposite direction. Therefore, the absolute value of the angular velocity 1001b is large. Moreover, the reaction force 1003b received from the vibrating motor 3b also becomes large.

By the force 1003a and force 1003b that are generated when the center of gravity 11a and the center of gravity 11b are in opposite phase in this way, a force is generated in order to give a feeling to the user of being pulled in a specific direction.

Next, FIG. 11 illustrates the state at time T2. The positions of the eccentric spindle 7a and the eccentric spindle 7b are as illustrated by the displacements illustrated in FIG. 6 to FIG. 9. As illustrated in FIG. 4, at time T2, the voltage impressed to the vibrating motor 3a becomes VL, so a large angular acceleration is not generated. Therefore, the angular velocity 1101a is not large. Moreover, the reaction force 1103a that is received from the vibrating motor 3a is also small. Similarly, as illustrated in FIG. 5, at time T2, the voltage that is impressed to the vibrating motor 3b becomes −VL, so a large angular acceleration is not generated. Therefore, the absolute value of the angular velocity 1101b is not large. The reaction force 1103b that is received from the vibrating motor 3b is also small.

The force 1103a and the force 1103b act in opposite directions, so the effect of the forces is cancelled out. In this way, in a state in which the phase of the center of gravity Ha and the center of gravity 11b match, it is difficult for a force to be generated due to change in the angular velocity.

Next, FIG. 12 illustrates the state at time T3. The positions of the eccentric spindle 7a and the eccentric spindle 7b are as illustrated by the displacements illustrated in FIG. 6 to FIG. 9. As illustrated in FIG. 4, at time T3, the voltage that is impressed to the vibrating motor 3a becomes VL, so a large angular acceleration is not generated. Therefore, the angular velocity 1201a is not large. Moreover, the reaction force 1203a that is received from the vibrating motor 3a is also small. Similarly, as illustrated in FIG. 5, at time T3, the voltage that is impressed to the vibrating motor 3b is −VL, so a large angular acceleration is not generated. Therefore, the absolute value of the angular velocity 1201b is not large. The reaction force 1203b that is received from the vibrating motor 3b is also small.

As in the state illustrated in FIG. 10, the center of gravity 11a and the center of gravity 11b are in opposite phase, and by the force 1203a and force 1203b, a force for giving the user a feeling of being pulled in a specific direction is generated, however, the force 1003a and force 1003b are in the opposite directions from the state illustrated in FIG. 10, and the size is also small. Therefore, overall, the effect of the combined force 1003a and force 1003b remains.

FIG. 13 illustrates the state at time T4. The positions of the eccentric spindle 7a and eccentric spindle 7b are as illustrated by the displacements illustrated in FIG. 6 to FIG. 9. As illustrated in FIG. 4, at time T4, the voltage applied to the vibrating motor 3a becomes VL, so a large angular acceleration is not generated. Therefore, the angular velocity 1301a is not large. Moreover, the reaction force 1303a that is received from the vibrating motor 3a is also small. Similarly, as illustrated in FIG. 5, at time T4, the voltage applied to the vibrating motor 3b becomes −VL, so a large angular acceleration is not generated. Therefore, the absolute value of the angular velocity 1301b is not large. The reaction force 1303b that is received from the vibrating motor 3b is also small.

As in the state illustrated in FIG. 11, the force 1303a and force 1303b are in opposite directions, so the effect of the forces is cancelled out. When the phases of the center of gravity 11a and the center of gravity 11b match in this way, it is difficult for a force due to the change in the angular velocity to occur.

As illustrated in FIG. 10 and FIG. 12, a state in which the reaction forces due to the change in angular velocity become large occurs two times in one cycle. However, in many cases, the magnitudes of the angular acceleration in those two states do not match, and the effect of one of the forces remains. As a result, the vibration device 301 gives the user a feeling such as being pulled in a specific direction.

Even without impressing the voltage as described in the example above, and displacing the center of gravity of the eccentric spindles, it is possible to cause a feeling of being pulled in either direction to be generated by repeatedly generating the same angular accelerations at the same timing within the rotation period, and repeatedly causing the angular velocity to be changed within the rotation period similarly.

Vibration that is based on the centrifugal force is generated by the vibrating motor 3a and vibrating motor 3b as conventionally done.

As described above, it is possible to cause vibration so as to give a user a feeling of being pulled in a specific direction, so even when a portable telephone terminal is placed, for example, in the pocket of a coat or thick clothing, by using the vibration device relating to this embodiment in the portable telephone terminal, it is possible to transmit the feeling that pulls the pocket in a specific direction through the clothing. Moreover, it is possible to give a feeling having impact to a user that has low sensitivity to vibration.

[Embodiment 2]

In the embodiment described above, an example was explained in which the rotating shaft 9a and the rotating shaft 9b are parallel and the vibrating motor 3a and the vibrating motor 3b are fastened to the substrate 1 in the same direction, however, in this embodiment, an example is explained in which the vibrating motor 3a and vibrating motor 3b are fastened to the substrate 1 so as to be in opposite directions.

Figure 14:
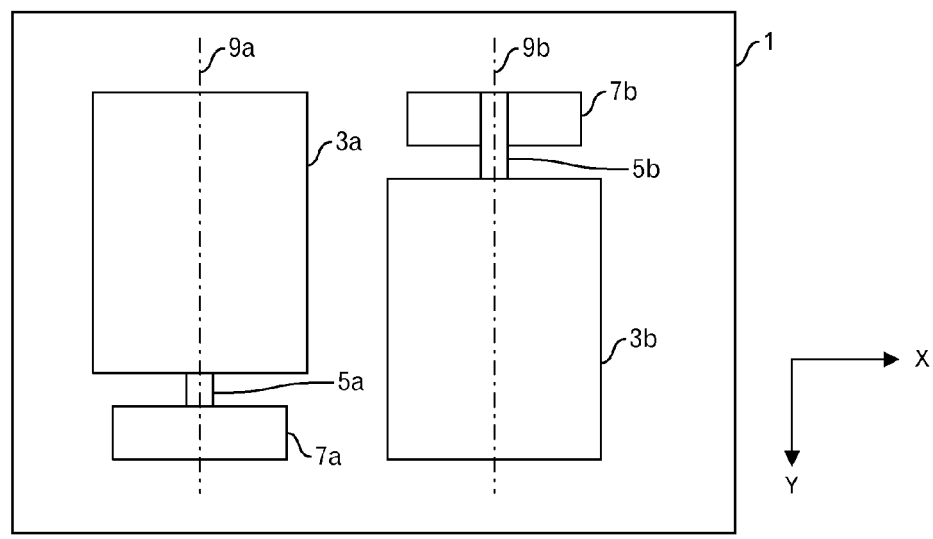
FIG. 14 is a diagram depicting an arrangement example of the vibrating motors in a second embodiment.

FIG. 14 illustrates an example of the arrangement of the vibrating motors relating to a second embodiment. In the figure, the vibrating motor 3a is installed in the same way as in FIG. 1. On the other hand, the vibrating motor 3b is installed in the opposite direction. The rotating shaft 9a and the rotating shaft 9b being parallel is the same as in FIG. 1.

In this embodiment, the voltage controller 303 applies voltage to the vibrating motor 3b as illustrated in FIG. 4 instead of FIG. 5. In other words, the voltage is applied to the vibrating motor 3a and vibrating motor 3b with the same polarity and same voltage. As described above, the vibrating motor 3b is arranged 180 degrees in the opposite direction of vibrating motor 3a, so the directions of rotation of the vibrating motor 3a and vibrating motor 3b are opposite each other. Therefore, the same action and effect as in the first embodiment is obtained.

[Embodiment 3]

The vibration device 301 described above may be mounted in an information processing terminal. Here, an example is explained in which a portable terminal device includes the vibration device 301 described above.

Figure 15:
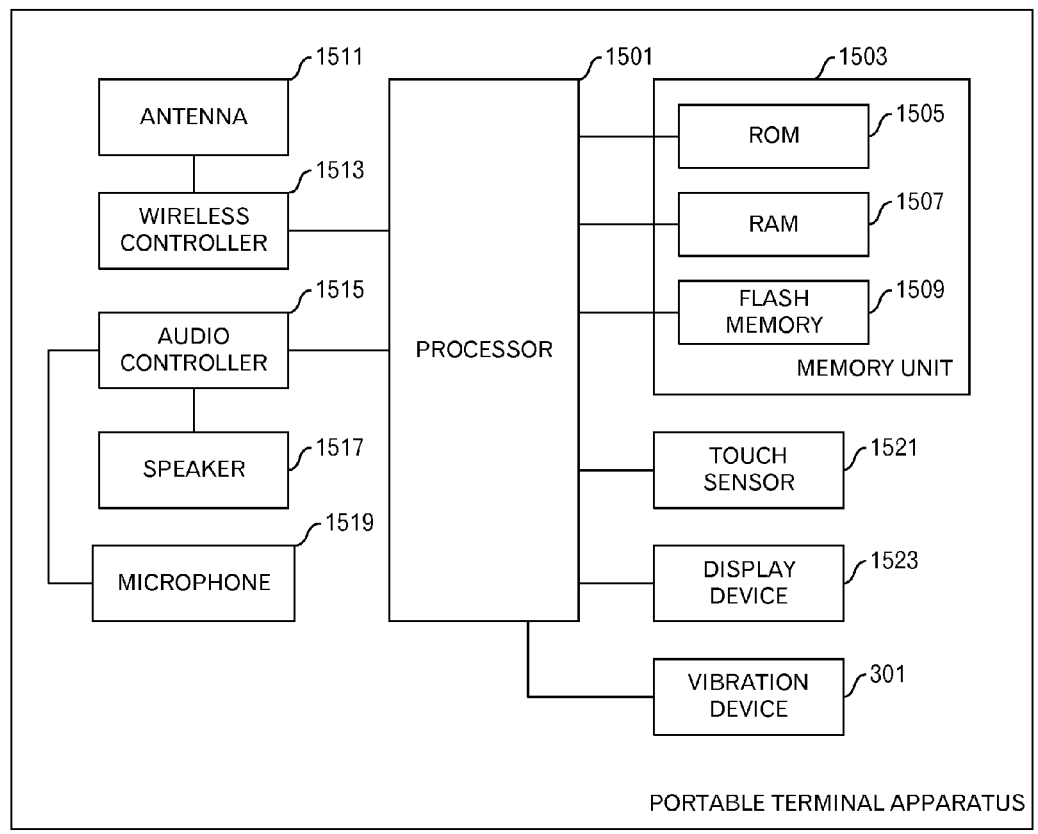
FIG. 15 is a diagram depicting a hardware configuration example of a portable terminal apparatus.

FIG. 15 illustrates an example of a hardware configuration of a portable terminal device. In addition to the vibration device 301 described above, the portable terminal device has a processor 1501, a memory unit 1503, an antenna 1511, a wireless controller 1513, an audio controller 1515, a speaker 1517, a microphone 1519, a display device 1523 and a touch sensor 1521.

The processor 1501 is an integrated circuit that performs computational processing related to the portable terminal device. The processor 1501 may include a modem CPU (Central Processing Unit) and an application CPU. The memory unit 1503, for example, has a ROM (Read Only Memory) 1505, a RAM (Random Access Memory) 1507 and a flash memory 1509. The ROM 1505, for example, stores application programs and control programs for controlling the voltage controller 303. The RAM 1507, for example, includes areas for deploying the application programs and control programs. The flash memory 1509, for example, stores user data.

The antenna 1511, for example, receives wireless data in a method such as a cellular method, wireless LAN (local Area Network) method, short distance communication method or the like. The wireless controller 1513 performs control of wireless communication. By performing wireless communication control, audio communication for a telephone call, and data communication for e-mail are performed.

The audio controller 1515 performs analog-to-digital conversion and digital-to-analog conversion of audio data. The speaker 1517 outputs analog data as sound. The microphone 1519 converts sound to analog data.

The touch sensor 1521, for example, is a panel-type sensor that is installed on the display screen of the display device 1523, and receives instructions by user's operations. The display device 1523, for example, displays various screens that are caused to be displayed by an application program.

By executing programs that are stored in the memory unit 1503, the processor 1501 may control the voltage controller 303 of the vibration device 301.

Furthermore, the application unit achieved by the processor 1501 executing application programs may activate the vibration device 301. For example, when notifying that it reached a corner, a navigation unit that performs route guidance may activate the vibration device 301. An application unit that is operating in the silent mode may activate the vibration device 301 when performing notification of an incoming telephone call or e-mail, or performing time notification.

Moreover, a unit for making the eccentric spindle 7a and eccentric spindle 7b in the initial state such as illustrated in FIG. 2 may be provided.

A portable terminal device was explained as an example of an information processing device. The portable terminal device may also be a portable telephone terminal, including a smartphone, a PDA (Personal Digital Assistant), compact PC (Personal Computer), or a portable game device. Moreover, this embodiment may also be applied to an information processing device that is not portable. Furthermore, this embodiment may be applied to any device such as a mouse or keyboard, or to a watch.

The aforementioned embodiments are outlined as follows:

A vibration apparatus relating to the embodiments includes: (A) a first vibrating motor that causes a first eccentric spindle to be rotated so that an angular velocity changes regularly within a rotation period; and (B) a second vibrating motor that causes a second eccentric spindle to be rotated in the same angular velocity as the angular velocity of the first eccentric spindle in an opposite rotation direction to a rotation direction of the first eccentric spindle. Then, the first vibrating motor and the second vibrating motor are arranged so that a rotating shaft of the first vibrating motor is parallel with a rotating shaft of the second vibrating motor.

With this configuration, it is possible to vibrate so as to give the user a feeling of the vibration device being pulled to a specific direction.

Furthermore, the vibration device may further include a voltage controller that regularly changes voltages impressed to the first vibrating motor and the second vibrating motor within the rotation period.

Thus, it is possible to vibrate the vibration device so as to give the user of a feeling of being pulled to a specific direction by controlling the voltages to be impressed.

An information processing apparatus relating to the embodiments includes: (A) a first vibrating motor that causes a first eccentric spindle to be rotated so that an angular velocity changes regularly within a rotation period;

and (B) a second vibrating motor that causes a second eccentric spindle to be rotated in the same angular velocity as the angular velocity of the first eccentric spindle in an opposite rotation direction to a rotation direction of the first eccentric spindle. Then, the first vibrating motor and the second vibrating motor are arranged so that a rotating shaft of the first vibrating motor is parallel with a rotating shaft of the second vibrating motor.

Thus, it is possible to vibrate the information processing apparatus so as to give the user a feeling of being pulled in a specific direction.

Furthermore, the information processing apparatus may further include a voltage controller that regularly changes voltages impressed to the first vibrating motor and the second vibrating motor within the rotation period.

According to this configuration, it is possible to vibrate the information processing apparatus so as to give the use a feeling of being pulled to a specific direction by controlling the voltages to be impressed.

Moreover, the information processing apparatus may include a processor that controls the voltage controller.

Thus, it is possible for the processor to control the vibration of the information processing apparatus.

The processor may control the voltage controller by executing a program.

Thus, the control is performed by executing the program.

Incidentally, it is possible to create a program causing a processor to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A vibration apparatus, comprising:
a first vibrating motor that causes a first eccentric spindle to be rotated so that an angular velocity changes regularly within a rotation period in which the first vibrating motor rotates once;
a second vibrating motor that causes a second eccentric spindle to be rotated in the same angular velocity as the angular velocity of the first eccentric spindle in an opposite rotation direction to a rotation direction of the first eccentric spindle; and
a voltage controller that sets first positive voltage impressed to the first vibrating motor from a start of the rotation period to a certain timing in the rotation period, sets second positive voltage impressed to the first vibrating motor from the certain timing to an end of the rotation period, sets first negative voltage impressed to the second vibrating motor from the start to the certain timing and sets second negative voltage impressed to the second vibrating motor from the certain timing to the end of the rotation period, and
wherein the first positive voltage is higher than the second positive voltage, the first negative voltage is higher than the second negative voltage, and the first vibrating motor and the second vibrating motor are arranged so that a first rotating shaft of the first vibrating motor is parallel with a second rotating shaft of the second vibrating motor.

2. An information processing apparatus, comprising:
a first vibrating motor that causes a first eccentric spindle to be rotated so that an angular velocity changes regularly within a rotation period in which the first vibrating motor rotates once; and
a second vibrating motor that causes a second eccentric spindle to be rotated in the same angular velocity as the angular velocity of the first eccentric spindle in an opposite rotation direction to a rotation direction of the first eccentric spindle;
a voltage controller that sets first positive voltage impressed to the first vibrating motor from a start of the rotation period to a certain timing in the rotation period, sets second positive voltage impressed to the first vibrating motor from the certain timing to an end of the rotation period, sets first negative voltage impressed to the second vibrating motor from the start to the certain timing and sets second negative voltage impressed to the second vibrating motor from the certain timing to the end of the rotation period; and
a processor that controls the voltage controller, and
wherein the first positive voltage is higher than the second positive voltage, the first negative voltage is higher than the second negative voltage, and the first vibrating motor and the second vibrating motor are arranged so that a first rotating shaft of the first vibrating motor is parallel with a second rotating shaft of the second vibrating motor.

3. The information processing apparatus as set forth in claim 2, wherein the processor controls the voltage controller by executing a program.

* * * * *